US006731617B1

United States Patent
Mizell et al.

(10) Patent No.: US 6,731,617 B1
(45) Date of Patent: May 4, 2004

(54) TUNNELING SIGNALING METHOD AND APPARATUS

(75) Inventors: Jerry L. Mizell, Plano, TX (US); Cecil L. Taylor, Plano, TX (US); Mark E. Hanson, Allen, TX (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/354,487

(22) Filed: Jul. 16, 1999

(51) Int. Cl.[7] .................................................. H04Q 7/00
(52) U.S. Cl. .................... 370/328; 370/338; 455/432.1; 455/433; 455/435.1
(58) Field of Search ............................. 455/432.1, 433, 455/435.1, 435, 432, 403, 445, 450; 370/338, 328, 329, 349, 401, 389, 353

(56) References Cited

U.S. PATENT DOCUMENTS

| | | | | |
|---|---|---|---|---|
| 5,390,366 A | * | 2/1995 | Kasugai ....................... 455/524 |
| 5,590,133 A | * | 12/1996 | Billstrom et al. ........... 370/349 |
| 6,119,021 A | * | 9/2000 | Katz ............................ 455/414 |
| 6,122,263 A | * | 9/2000 | Dahlin et al. ................ 370/329 |
| 6,233,458 B1 | * | 5/2001 | Haumont et al. ........... 455/417 |
| 6,240,514 B1 | * | 5/2001 | Inoue et al. ................. 380/248 |
| 6,266,330 B1 | * | 7/2001 | Jokinen et al. ............. 370/280 |
| 6,301,242 B1 | * | 10/2001 | Lindsay et al. ............. 370/347 |
| 6,359,904 B1 | * | 3/2002 | Hamalainen et al. ....... 370/328 |
| 6,438,115 B1 | * | 8/2002 | Mazur et al. ............... 370/330 |
| 6,480,485 B1 | * | 11/2002 | Kari et al. .................. 370/352 |
| 6,487,209 B1 | * | 11/2002 | Valentine et al. ........... 370/401 |
| 6,496,690 B1 | * | 12/2002 | Cobo et al. ................. 455/408 |
| 6,577,637 B1 | * | 6/2003 | Sieppi ......................... 370/401 |

OTHER PUBLICATIONS

GSM 03.60 European Standard (Telecommunication Series) (V6.2.0) (Oct. 1998) 1998, European Telecommunications Standards Institute.

* cited by examiner

*Primary Examiner*—Charles Appiah
*Assistant Examiner*—Nghi H. Ly
(74) *Attorney, Agent, or Firm*—Carr LLP

(57) ABSTRACT

Disclosed is an apparatus providing minimal systems alterations in non-GSM cellular systems wishing to incorporate GSM GPRS messaging capability. This is accomplished by giving a registering terminal or MS an IP address for use in receiving both signaling and traffic data messages rather than using the SGSN as the traffic receiving entity and forwarding traffic to the MS from the SGSN and requiring signaling messages to be transmitted from the MSC to the MS by other means. This approach simplifies the integration of GPRS capability into any non-GSM configuration cellular system by providing a generic way to exchange signaling information between any MSC, having a known IP address, and any MS with an assigned IP address.

7 Claims, 3 Drawing Sheets

TUNNELING SIGNALING METHOD AND APPARATUS

TECHNICAL FIELD

The present invention relates in general to GPRS (General Packet Radio Service) and in particular to methods and systems for tunneling data packets whereby data packets could traverse either one of GSM (Global System for Mobile Communication) and a foreign network such as a TDMA (Time Division Multiple Access) network to reach a given MS (Mobile Station).

BACKGROUND

GPRS refers to a recently implemented high-speed packet data technology. GPRS is expected to profoundly alter and improve the end-user experience of mobile data computing, by making it possible and cost-effective to remain constantly connected, as well as to send and receive data at much higher speeds than in the past. Its main innovations are that it is packet based, that it can increase data transmission speeds from the previous 9.6 Kbps to over 480 Kbps, and that it may be used to extend the Internet connection all the way to the mobile PC. In other words, the user will no longer need to dial up a separate ISP. However, GPRS complements rather than replaces the prior art data services available through cellular networks, such as circuit-switched data and SMS (Short Message Service) that has been available in some cellular telephone networks such as GSM.

Because GPRS supports standard networking protocols, configuring computers to work with GPRS is very straightforward. In the case of IP communications, one is able to use existing TCP/IP protocol stacks, such as the stack that comes with widely available operating systems such as Windows 95. TCP/IP stacks are readily available for most other platforms as well.

Another feature of GPRS is that it supports a message transmission technology typically referred to as tunneling. Tunneling is the use of encapsulation to deliver messages through a network where that network has no knowledge of the message. One use of tunneling is to support private communications over a public network to provide what is known as a VPN (virtual private network). Software is used at each end of the communication to encapsulate sent and de-capsulate received messages. In accordance with the GPRS standard, traffic data packets are tunneled across any intervening networks from a SGSN (Serving GPRS Support Node) associated with a source of traffic data packets to a GGSN (Gateway GPRS Support Node) associated with the receipt of the traffic. To forward IP or X.25 packets between each other, the SGSN and GGSN encapsulate these packets using a specialized protocol called the GPRS tunnel protocol (GTP) which operates over the top of standard TCP/IP protocols.

The GPRS standard further defines three (3) classes of terminals or Mobile Stations. (MSs). A class A terminal may receive both switched circuit and packet data communications simultaneously. A class B terminal may be used in either a packet data mode or a switched circuit mode, but may not be used in both modes simultaneously. A class C terminal is only usable for packet data communications.

The GSM GPRS network, defined by ETSI standards beginning with 03.60, has been selected as the standard for use in the North American TDMA market for data packet service. Since GSM and TDMA use somewhat different approaches in providing signaling messages to and from a given MS there are some inconsistencies that need to be solved between the voice and data networks in the TDMA system. In other words, the standard TDMA method of delivering the signaling messages is not appropriate for an MS designed in accordance with the GSM GPRS packet data standard.

One possible solution for resolving the differences is to change the GPRS network to accept signaling information from the TDMA network. This approach is undesirable in that it would require a considerable amount of standards definition work. Further, if it came to pass that other networks wanted to be able to receive and transmit signaling messages to a MS designed in accordance with standards agreed upon in the in a GSM GPRS and North American TDMA (TDMA 136) GPRS, further standards definition work would be required. A more desirable approach is to find a method whereby a signaling path can be provided transparently through the GPRS network from any MSC (Mobile Switching Center) whether part of a GSM, TDMA-136, CDMA or other type cellular network, directly to any MS registered to that home MSC. If such a solution would allow a packet data MS to roam to and operate in foreign type networks, while still receiving signaling messages from its home network, the method would have great economic impact.

SUMMARY OF THE INVENTION

The present invention comprises a method of permitting a home MSC and an MS, registered with that home MSC, located anywhere in the GPRS network to exchange signaling messages through the process of assigning IP addresses to both the MSC and to the MS, when the MS registers with the GPRS network, tunneling encapsulated signaling messages through the network between the MS and its associated home MSC and de-encapsulating the signaling messages at the signaling message destination.

BRIEF DESCRIPTION OF THE DRAWINGS

For a more complete understanding of the present invention, and its advantages, reference will now be made in the following Detailed Description to the accompanying drawings, in which.

DETAILED DESCRIPTION

Figure 1:
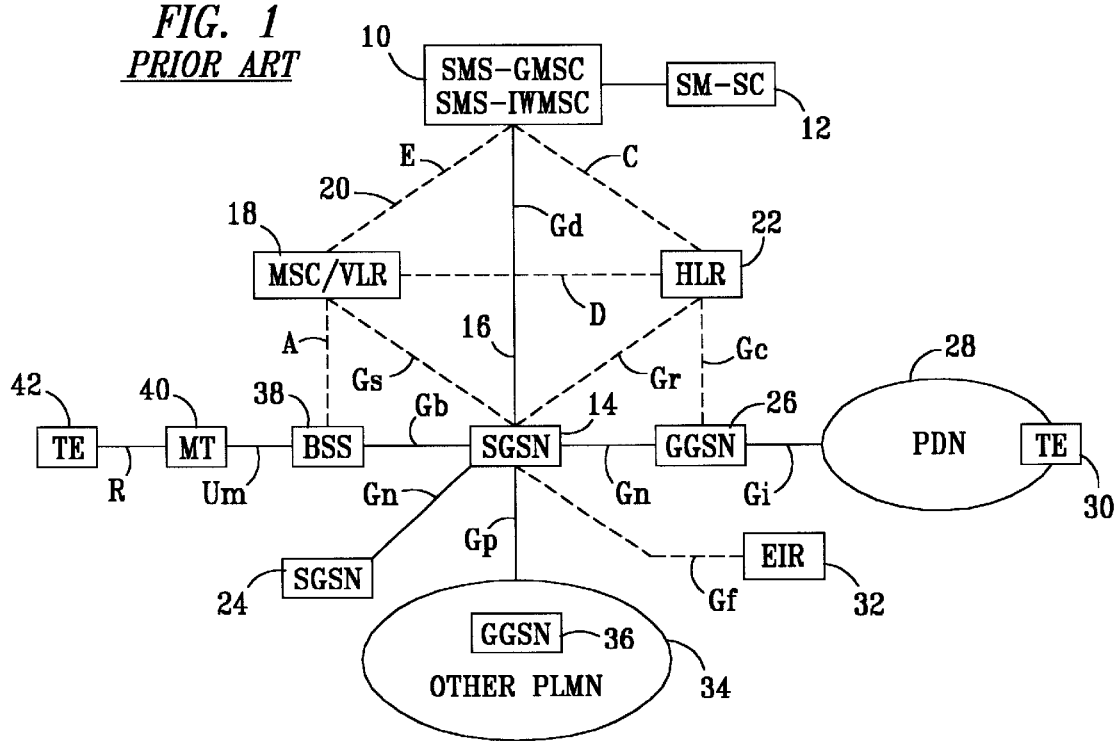
FIG. 1 is a block diagram of the components involved when integrating GPRS with an existing GSM cellular network.

FIG. 1 is a drawing taken directly from the above referenced GSM 03.60 standard. In this drawing, a block 10 comprises SMS (Short Message Service) circuitry including the GMSC (Gateway Mobile Switching Center) and the IWMSC (InterWorking MSC). As illustrated in this drawing, the solid lines interconnecting blocks represent both data (traffic) and signaling interfaces while the dash lines represent signaling interfaces only. Block 10 is connected by a solid line to a block 12 further labeled with SM-SC (Short Message Service Centre). Block 10 is also connected to a SGSN (Serving GRPS Support Node) block 14 via a solid line 16. Line 16 is further labeled $G_d$ as a defined GSM interface. Block 10 is further connected to a MSC/VLR (MSC/Visitor Location Register) block 18 by a dash line E also labeled as 20 and is connected via a dash line C to an HLR (Home Location Register) 22. Blocks 18 and 22 are interconnected by a dash line D. The SGSN block 14 is connected to a further SGSN block 24 via a solid line interface $G_n$, and is connected via a similar interface to a GGSN (Gateway GPRS Support Mode) block 26. The blocks 22 and 26 are interconnected by a dash line interface labeled $G_c$. The GGSN 26 is connected via a solid line interface $G_i$ to a PDN (Packet Data Network) 28 including at least one TE (Terminal Element) block 30. A dash line interface $G_f$ interconnects SGSN 14 with an EIR (Equipment Identity Register) block 32. Another PLMN (Public Land Mobile Network) in shown interconnected to SGSN block 14 via a solid line interface labeled $G_p$. This $G_p$ connection would interface with one or more GGSN blocks within PLMN 34 such as GGSN block 36. A solid line interface labeled $G_b$ interconnects SGSN 14 with a BSS (Base Station System) block 38. A dash line interface labeled A interconnects blocks 18 and 38. BSS 38 is connected to a MT (Mobile Terminal) block 40 via a solid line interface $U_m$. A TE block 42 communicates with MT 40 via a solid line interface R. The only blocks that had to be added to a GSM cellular network to enable concurrent use of GPRS are the SGSN and GGSN blocks. The interfaces labeled with a G and a subscript letter were either redefined from the original GSM cellular standards or added as new definitions to accommodate GPRS.

Figure 2:
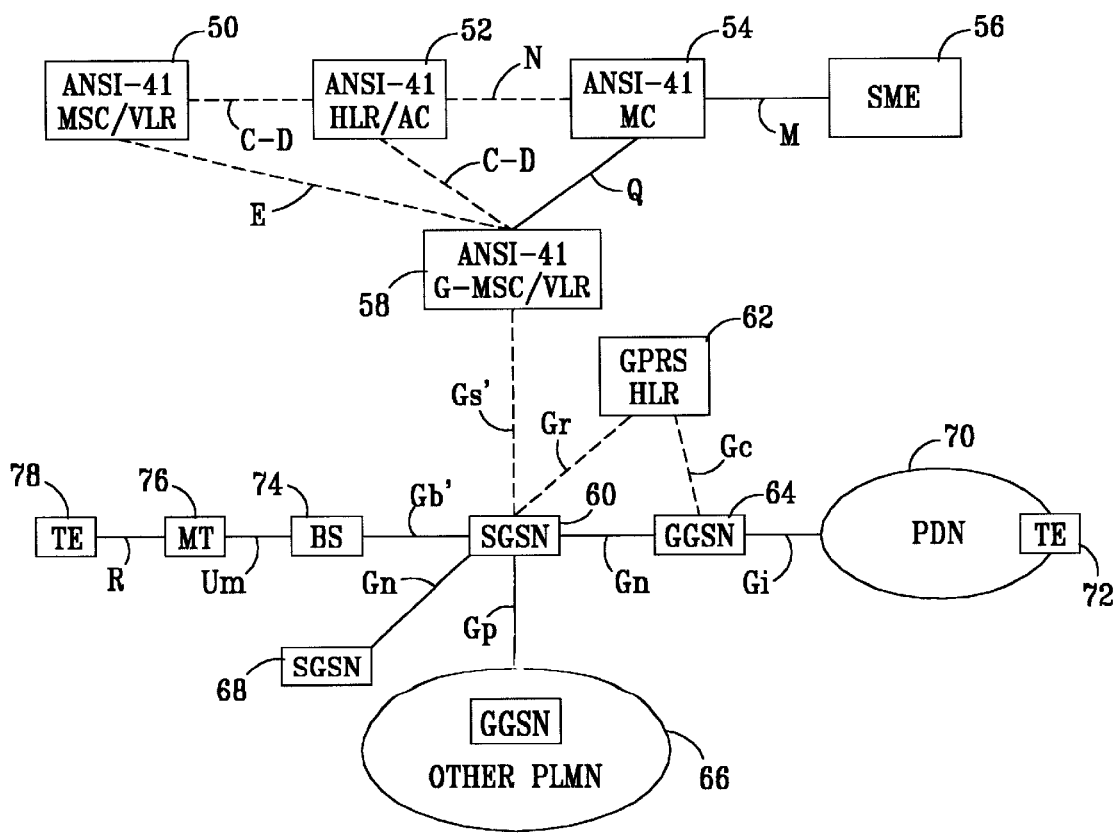
FIG. 2 is a block diagram of the components involved when integrating GPRS with an existing TIA/EIA-136 cellular network.

FIG. 2 is a drawing taken directly from a proposed industry standard defining the structure of a North American TDMA wireless service incorporating GPRS and having a document designation of SP-4027-932. A common reference for such a system is GPRS 136. In this drawing, there are shown several blocks 50, 52, 54, 56 and 58 in the upper portion. Blocks 50, 52, 54 and 58 include the term ANSI-41 to provide an indication that the function of component in that block needs to function differently from what it would if the cellular system did not have to accommodate GPRS signaling and traffic; in other words, a TDMA cellular system as defined in the TIA/EIA-136 standards.

Block 50 represents a circuit switched MSC/VLR. Block 52 represents a circuit switched HLR/AC where AC refers to the Authentication Center portion of the network. Blocks 50 and 52 communicate over a C-D interface. Block 54 represents the MC, where MC refers to the Message Center portion of the network, and block 54 communicates with block 52 over an N interface. The block comprises the SME (Security Management Entity) which communicates with block 54 over an M interface. The block 58 represents the GPRS Gateway MSC/VLR and communicates with blocks 50, 52 and 54 through interfaces labeled E, C-D and Q respectively. An SGSN block 60 communicates with block 58 over a signaling interface labeled $G_s'$, with a GPRS HLR block over a signaling interface labeled $G_r'$, with a GGSN block 64 over an interface labeled $G_n$, with another PLMN 66 over an interface labeled $G_p$ and with another SGSN 68 over an interface labeled $G_n$. The GGSN 64 is shown communicating with a PDN 70 over an interface labeled Gi to a TE block 72. A BS (Base Station) block communicates over a $G_b'$ interface and to an MT block 76 over a solid line interface $U_m$. A TE block 78 is shown communicating with MT 76 over an interface R.

As set forth in the proposed standard for GPRS-136, blocks 52, 60, 74 and 76 in FIG. 2 operate differently from their corresponding counterparts in a GSM GPRS system as shown in FIG. 1 to accommodate the signaling message differences from TIA-136 systems. These differences require further signal translations, above those previously required, when the MS is located in the coverage area of a system of a type foreign to that of its home MSC. If other cellular network types wish to incorporate the GPRS data handling capability, the signal translation problems are compounded.

The present invention requires only a small amount of additional software in the MS to encapsulate and de-capsulate signaling messages and a modification of the protocol stack interfaces in the SGSN and the MSC.

Figure 3:
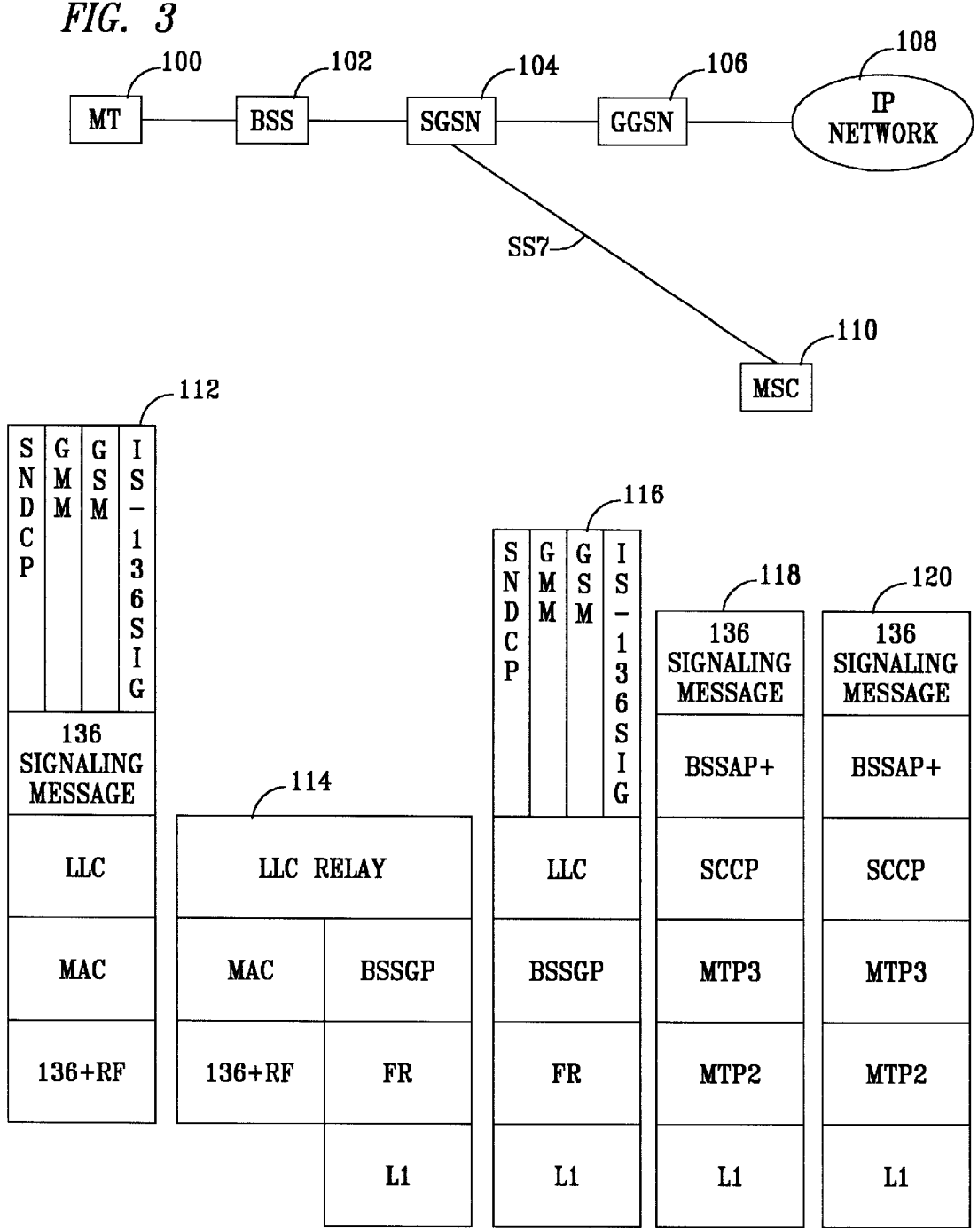
FIG. 3 illustrates the protocol stack interfaces needed, in practicing the present invention, to provide signaling between an MS and the home MSC when the MS is located in the home network.

In FIG. 3, an MT 100 is shown connected through a BSS 102 to an SGSN 104. SGSN 104 is shown connected through a GGSN 106 to an IP Network 108 and is also connected via a SS7 interface to a local or home MSC 110 in a GPRS-136 environment. A message stack 112 illustrates the format of messages received by or generated by MT 100. The acronyms within stack 112 are defined in the GSM GPRS standards except for 136+RF and IS 136 Sig which would be GPRS-136 specific. Thus SNDCP (SubNetwork Dependent Convergence Protocol), GMM (GPRS Mobility Management), GSM (GPRS Session Management), LLC (Logical Link Control) and MAC (Medium Access Control) are well defined and understood by those familiar with GSM GPRS. The BSS 102 must translate some signals, thus the stack 114 has two columns. The BSS merely relays the portion of the stack starting with LLC and above from SGSN 104 to MT 100. On the other hand the BSSGP (Base Station Subsystem GPRS Protocol) and NS (Network Services) layers are terminated in the BSS and SGSN and are used to deliver information between the two entities. The MAC and 136+RF layers are used to deliver information between the BSS and the MS. The SGSN 104 completely changes the stack between the formats shown in stack 116 and 118 in communicating from BSS 102 to MSC 110 in order to pass over the local SS7 interface to the home MSC. The portions SCCP, MTP2 (Message Transfer Part layer 2) and MPT3 (Message Transfer Part layer 3) are defined in the GSM and ANSI standards.

Figure 4:
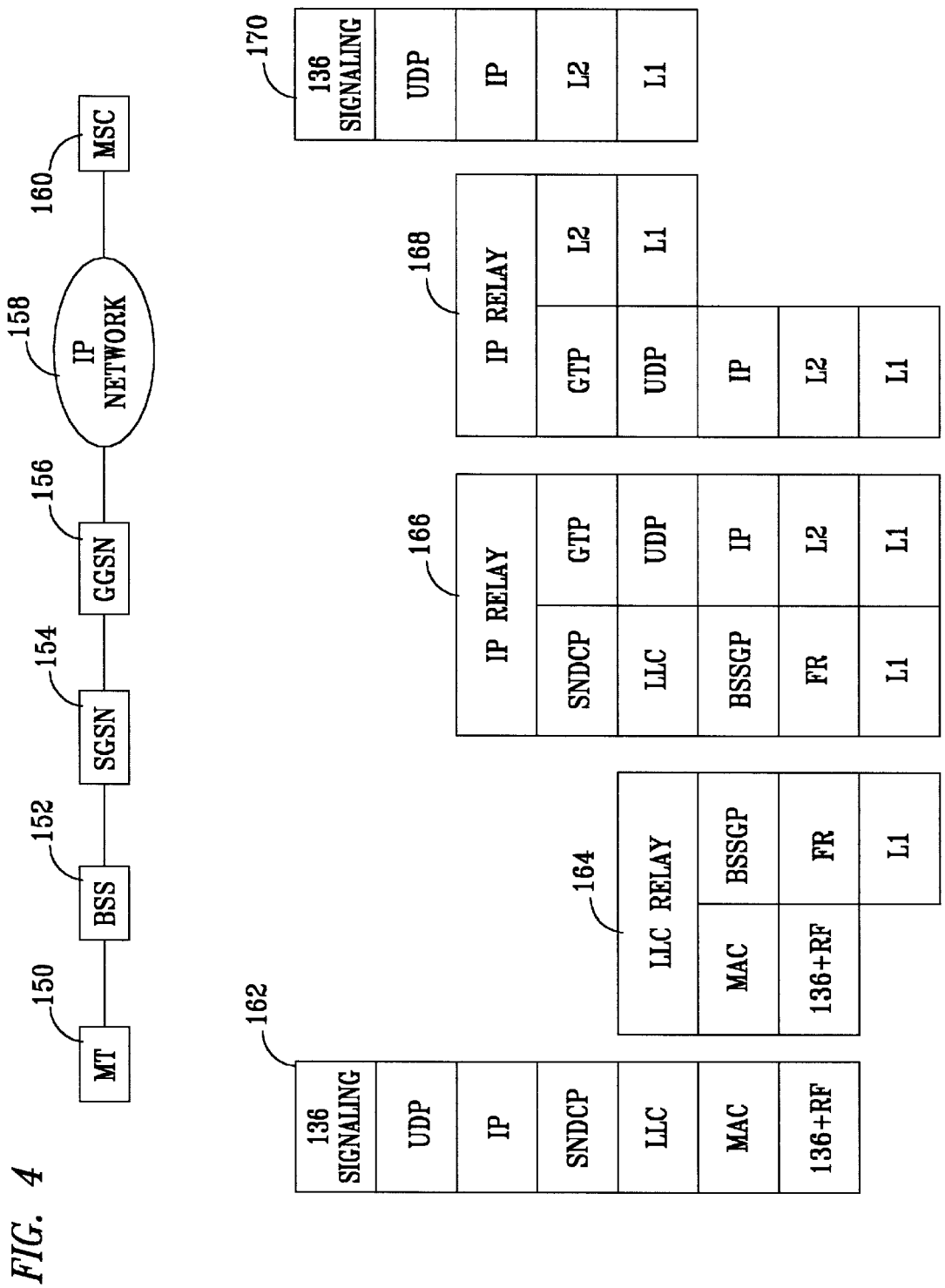
FIG. 4 illustrates the protocol stack interfaces needed, in practicing the present invention, to provide signaling between an MS and the home MSC when the MS is located in a network remote from the home network.

In FIG. 4, communications from a roaming MT 150 are passed consecutively through a BSS 152, an SGSN 154, an GGSN 156 and an IP network 158 to get to a home MSC 160 located in a network foreign to the location of MT 150. Stack interfaces 162, 164, 166, 168 and 170 shown below the equipment block represent respectively the stacks for blocks 150, 152, 154, 156 and 160 since the IP network 158 merely sees what it considers to be a standard IP communication. All the portions of each of the stacks comprise previously defined stack layers for GSM GPRS systems and are readily identifiable to those skilled in the art. The only layer not previously mentioned is the UDP (User Datagram Prototcol).

From the above, it will be apparent that the present approach eliminates standards redefinitions and compromises as required by the proposed TIA/EIA-136 document SP-4027-932. The only changes required by the MS (terminal equipment or mobile station) are the addition of software to accept signaling messages as well as traffic in the form of IP communications and a slight alteration in philosophy of system design whereby all signaling to an MS originates from the home MSC once registration is completed. All the signaling would be encapsulated within an IP protocol message and the MS can readily detect whether an incoming message packet is signaling or traffic data. Further, system simplification is obtained in that VLR tracking is not required by the local network within which an MS is presently located as long as the MS is registered and able to receive GPRS messages.

Referring back to FIG. 4, blocks 150 to 160 may be considered a GPRS system where MSC 160 is part of a home GPRS compliant network. The MSC has an IP address known to the MSs of that Network. The blocks 152–156 may be considered a foreign GPRS compliant network including a roaming MS or MT 150 which has MSC 160 as its home MSC. The IP network provides interconnection capability between said home MSC 160 and the roaming MS 150 wherein control signals for controlling MS 150, after registration, are supplied, encapsulated in IP format, from said home MSC 160 rather than the MSC and cellular network (not shown other than in prior art FIGS. 1 and 2) that controls base station 152.

In operation, the MS or MT 150 when being used in the packet data or GPRS mode includes means for accepting an IP address from the SGSN 154 and the GGSN 156 of the foreign network in which the MT 150 is located. This assigned IP address is used for the duration of the receipt of a traffic message regardless of the message source. The assigned IP address is forwarded by the MS 150 to the home MST 160 where this information is stored in the MSC 160. The MS 150 then receives all further messages sent through the GPRS network using the accepted IP address. These messages, which are tunneled through the GPRS network, may be traffic or signaling messages and a portion of the encapsulated message will tell which type of message is being received. The MS 150 further includes means for decapsulating received messages to retrieve signaling messages embedded therein. Finally, MS 150 includes means for altering states of a connection process within said MS in accordance with retrieved signaling messages.

With the design philosophy set forth above, it will be apparent that other cellular networks may be readily adapted to provide signaling messages to a MS registered with a GPRS network without new standards being required.

Although the invention has been described with reference to a specific embodiment, these descriptions are not meant to be construed in a limiting sense. Various modifications of the disclosed embodiments, as well as alternative embodiments of the invention, will become apparent to persons skilled in the art upon reference to the description of the invention. It is therefore, contemplated that the claims will cover any such modifications or embodiments that fall within the true scope and spirit of the invention.

What is claimed is:

1. An MS (Mobile Station) for use in a GPRS (General Packet Radio Service) network comprising:

means for accepting an IP (Internet Protocol) address for the duration of receipt of a traffic message;

means for receiving messages from the GPRS network having the accepted IP address;

means for de-capsulating received messages to retrieve signaling messages embedded therein; and means for altering states of a connection process within said MS in accordance with the retrieved signaling messages from the GPRS network having the accepted IP address.

2. The method of passing signaling messages from a TDMA (Time Division Multiple Access) MSC (Mobile Switching Center) to an MS (Mobile Station) comprising the steps of:

assigning an IP (Internet Protocol) address to a MS when the MS registers;

encapsulating signaling messages within an IP message;

tunneling signaling messages over a GPRS network from the home TDMA MSC to a given MS;

sending the assigned IP address to the home MSC of the MS;

de-capsulating, at the given MS, the encapsulated signaling message within the received IP message from the GPRS network, wherein the signaling messages are generated by the home MSC; and altering states of a connection process within the MS in accordance with the retrieved signaling messages from the GPRS network generating the assigned IP address.

3. A cellular system for communicating GPRS (General Packet Radio Service) messages comprising:

an MS (mobile station) having an IP address that can distinguish between received traffic and signaling messages;

registering means for assigning an IP address to the MS when it registers for service;

an MSC (Mobile Switching Center), having an IP address, for encapsulating signaling messages in IP (internet protocol) format to be sent for the control of any MS having that MSC as a home MSC; and means for altering states of a connection process within the MS in accordance with the retrieved signaling messages from the GPRS network generating the assigned IP address.

4. The apparatus of claim 3 comprising, in addition:

encapsulating and de-capsulating means comprising part of said MS for sending control signals to and receiving control signals from the home MSC of said MS.

5. A method of providing control signaling messages from a home MSC (Mobile Switching Center) to an MS (mobile station) in a GPRS (General Packet Radio Service) messaging system integrated into a cellular network comprising:

assigning an IP (Internet Protocol) address to a MS when the MS registers with the GPRS system;

notifying the home MSC of the IP address of said MS;

encapsulating control signal messages in IP format for controlling the MS directly from said home MSC over any intervening IP networks;

means for accepting the IP address for the duration of receipt of a traffic message from the GPRS; and means for altering states of a connection process within the MS in accordance with retrieved signaling messages from the GPRS network having the accepted IP address.

6. An MS (Mobile Station) for use in a GPRS (General Packet Radio Service) network comprising:

means for accepting an IP (Internet Protocol) address for the duration of receipt of a traffic message from the GPRS network;

means for de-capsulating received IP format messages from a home MSC to retrieve signaling messages embedded therein; and means for altering states of a connection process within the MS in accordance with retrieved signaling messages from the GPRS network generating the accepted IP address.

7. A method of controlling an MS (Mobile Station) in a GPRS (General Packet Radio Service) network where the MS is located in a network remote from the home MSC (Mobile Switching Center) of that MS comprising the steps of:

assigning an IP (Internet Protocol) address to an MS when it registers;

notifying the home MSC of the IP address of said MS; and transmitting signaling communications between said MSC and said MS directly in IP format, wherein the signaling messages are generated by the home MSC; and altering states of a connection process within the MS in accordance with retrieved signaling messages from the GPRS network generating the assigned IP address.

* * * * *